(12) United States Patent
Berry et al.

(10) Patent No.: US 6,350,087 B1
(45) Date of Patent: Feb. 26, 2002

(54) TOOL-FREE COLLET TIGHTENER

(75) Inventors: Robert Alan Berry, Mt. Airy; Michael E. Bitzel, Reisterstown; Allen K. Brelsford, Baldwin, all of MD (US); John L. McKibben, Dallastown, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/612,069

(22) Filed: Jul. 7, 2000

(51) Int. Cl.[7] .................... B23B 31/165; B23C 1/20
(52) U.S. Cl. ............... 409/131; 279/52; 144/154.5; 409/134; 409/137; 409/182; 409/231
(58) Field of Search ............... 279/48, 52, 56, 279/149, 150; 409/131, 132, 134, 137, 182, 231, 233; 144/136.95, 154.5

(56) References Cited

U.S. PATENT DOCUMENTS

| | | | | |
|---|---|---|---|---|
| 2,211,216 A | | 8/1940 | Oster ........................... 51/170 |
| 2,343,875 A | * | 3/1944 | Schwartz .................... 409/231 |
| 2,575,903 A | | 11/1951 | Youhouse .................... 279/52 |
| 2,807,732 A | | 9/1957 | Kurtovich .................... 310/50 |
| 2,897,302 A | | 7/1959 | Godfrey et al. .............. 200/42 |
| 3,811,361 A | * | 5/1974 | Seely et al. ................. 279/52 |
| 3,872,951 A | | 3/1975 | Hastings, Jr. ................. 188/69 |
| 4,324,512 A | | 4/1982 | Siroky ......................... 408/240 |
| 4,358,230 A | | 11/1982 | Rohlin ......................... 408/124 |
| 4,389,146 A | | 6/1983 | Coder .......................... 408/240 |
| 4,817,972 A | * | 4/1989 | Kubo ........................... 279/48 |
| 4,827,996 A | * | 5/1989 | Cotton et al. ................. 409/182 |
| 5,191,698 A | | 3/1993 | McCurry ..................... 200/43.11 |
| 5,346,342 A | * | 9/1994 | Winchester .................. 409/134 |
| 5,496,139 A | | 3/1996 | Ghode et al. ................ 409/182 |
| 5,590,988 A | | 1/1997 | Rusconi ....................... 409/182 |
| 5,730,596 A | | 3/1998 | Rosenstatter ................. 433/127 |
| 5,813,805 A | | 9/1998 | Kopras ......................... 408/241 |
| 5,829,931 A | | 11/1998 | Doumani ..................... 409/132 |
| 5,902,080 A | | 5/1999 | Kopras ......................... 409/182 |
| 5,921,730 A | * | 7/1999 | Young et al. ................ 409/182 |
| 5,997,225 A | * | 12/1999 | Young et al. ................ 409/182 |
| 6,048,260 A | | 4/2000 | Kopras ......................... 451/358 |
| 6,264,208 B1 | * | 7/2001 | Sakamaki et al. ........... 409/182 |

FOREIGN PATENT DOCUMENTS

| | | |
|---|---|---|
| DE | 4014381 | 11/1991 |
| DE | 19613680 | 10/1997 |
| EP | 0730927 | 9/1996 |
| WO | 9721512 | 6/1997 |

* cited by examiner

Primary Examiner—Daniel W. Howell
(74) Attorney, Agent, or Firm—Michael P. Leary; Bruce S. Shapiro

(57) ABSTRACT

A collet assembly for a tool comprising a collet nut rotatably connectable to the tool; a collet operatively connectable to the collet nut; and a collet wrench movably connected with the tool and engageable with the collet nut for tightening and loosening the collet.

58 Claims, 7 Drawing Sheets

TOOL-FREE COLLET TIGHTENER

BACKGROUND OF THE INVENTION

1. Field of the Invention

The present invention relates generally to the field of power tools. In particular the present invention relates to a tool-free collet assembly for gripping interchangeable tool accessories, such as drill bits, and including a dust management system.

2. Discussion

Various types of tools require a user to selectively attach a tool accessory such as a drill or router bit. Over the course of a particular project or work period it may be necessary to employ a variety of such accessories and to replace worn or broken ones. Convenient removal and replacement of the interchangeable tool accessories is therefore desirable. Two commonly employed mechanisms for holding interchangeable accessories are chucks and collets. Collet type mechanisms are usually favored for tools with higher rotational speeds.

In a collet-type holder the shank of a tool accessory is inserted into the bore of a collet. A collet is a generally cylindrical element with a longitudinal bore. The collet has at least one end with a plurality of longitudinally extending arcuate jaws arranged equiangularly around the circumference of the collet and spaced apart by a plurality of longitudinally extending cuts. The collet may be machined into the end of a tool output element (such as a shaft, spindle or arbor) or it may be a separate (sometimes barrel-shaped) element.

Over the collet is installed a collet nut or collet ring. The collet nut is threaded onto the end of the tool shaft or spindle. Threading the collet nut down on the spindle causes surfaces on the inside of the collet nut and/or shaft to compress the jaws of the collet around the shank of the tool accessory. Thus, the tool accessory is secured to the power tool shaft/spindle.

When changing accessory tools, the nut must be loosened to allow the collet to expand and release its grip on the tool accessory. The tightening and loosening of the collet nut may be partially performed by hand, but the size and shape of the collet nut make it difficult and/or uncomfortable to properly tighten and then initially loosen the collet nut using hands alone. Therefore, it is necessary to use a hand wrench or similar tool in order to apply sufficient torque to the collet nut.

In the case of rotary or power tools, when tightening or loosening the collet nut, the shaft/spindle must be prevented from rotating or else it would be difficult to achieve relative motion between the nut and the rotatable spindle.

Conventionally, the loosening and tightening process requires that the operator simultaneously grip both the shaft/spindle and the collet nut with two separate hand wrenches or the like. Then a torque is applied to the nut while the shaft is held in place. This is an awkward process and made even more so by the necessity to support the weight of the tool itself.

More recently, tools have been designed that incorporate a locking mechanism that locks the shaft/spindle relative to the tool housing. Thus, the rotation of the shaft can be prevented, simply by employing the built in shaft lock. For such a power tool, only one hand wrench is required to loosen or tighten the collet nut. See, for example, U.S. Pat. Nos. 5,496,139 and 5,813,805.

The need to use even one hand tool to change tool accessories, however, is still inconvenient. For example, when a bit replacement is required, the tool operator has to stop what he is doing to find a wrench. This delay can be meaningful in jobs, such as drywall installation during major construction or remodeling projects, where high production rates are essential.

Because many of the tools that may incorporate this invention are employed in dust and debris producing tasks, it is desirable that any features added to such tools be designed to resist fouling by dust.

SUMMARY OF THE INVENTION

It is, therefore, one object of the invention to provide a tool with a collet assembly that allows the user to conveniently install or remove an accessory without the use of any hand tools.

It is another object of the invention to provide an operating member with an exposed and graspable collet grip that provides enough mechanical advantage to permit the operator to exert sufficient torque for tightening or loosening the collet nut without having to use a hand tool.

This and other objects of the invention are attained by a tool-free collet assembly with an integral collet wrench. The collet wrench is rotatably mounted on the tool for turning the collet nut so as to tighten or loosen the collet. The collet wrench is also movable between an engaged position, wherein the collet wrench can turn the collet nut, and a disengaged position, wherein the collet wrench does not restrain the collet nut and does not interfere with normal rotation of the collet nut when the tool is operated. The movement of the collet wrench between the engaged and disengaged positions could be axial, radial, rotational, or some combination thereof.

The collet wrench may be biased into the disengaged position. This may be accomplished by a spring or other means for exerting a biasing force.

An operating member may connect the collet wrench to the tool. The operating member supports the collet wrench for movement between the engaged and disengaged position. The operating member may also be moveably mounted on the tool for imparting movement to the collet wrench. The operating member may include an externally exposed and manually graspable collet grip. By means of the collet grip, the operator can move the collet wrench rotationally and/or axially.

A collet wrench button may also be provided for moving the collet wrench between the engaged and disengaged position.

The collet wrench itself may be of several types. It may be of an open end or closed end (box wrench) type design. Alternatively, it may be of a complex interior shape. Such a complex shape may have two portions. A first portion corresponds to the disengaged position and within that first portion the collet nut may freely rotate during normal operation of the tool. The second portion corresponds to the engaged position and the surface of the second portion is shaped to contact and turn the collet nut.

The collet nut and/or the spindle on which it is threaded may be partially coated with a non-stick material to reduce the torque necessary to loosen the collet. The nonstick material could be, for example, Teflon®.

The internal surfaces of the collet nut and the spindle may cooperate with interchangeable collets having substantially identical external geometries and dimensions, but having different bores for gripping accessories with shanks of various diameters and geometries.

Another feature of this invention is an improved spindle lock design. The improved design is similar to that of the collet wrench and may incorporate either an open-ended wrench or one of complex shape as described within.

Certain jobs employing rotary cutout and router tools, for example drywall cutting, produce dust that can get inside the tool and foul the operation of the buttons and operating member. Therefore, it is still another object of the invention to provide a tool free collet assembly that is resistant to fouling in a dusty or dirty environment. This object is accomplished by a design that accepts that the entrance of some dust is inevitable and works to ensure that dust that gets into the mechanisms can also get out and does not accumulate to levels that interfere with the operation of the tool. This design incorporates several basic features or techniques, which coact to produce a dust management system as follows:

- the use of looser tolerance between parts that move relative to each other;
- the avoidance or minimization of interior dead ends or pockets from which dust can escape only very slowly;
- the action of moving parts incidentally tends to move or push dust along a general flow path towards intended exit points;
- horizontal or vertical boundaries between sub assemblies are provided with through holes to permit the movement of dust; and
- interior components do not fit closely against the exterior sheath or housing around the entire interior perimeter so that dust is able to move around those components.

This dust management design approach is principally a passive one. That is, it does not provide a dedicated means for forcing the dust out. Rather, it seeks to avoid trapping the dust and relies on a dust flow arising from the movement of the tool as the operator uses it and randomly moves it about in various positions and orientations. Some impetus may be given to the dust by motion of moving parts and by the cooling air flows produced by a motor fan. Lastly, the same features that discourage dust build up also allow for easier cleaning of the tool, for example by blowing out with compressed air, if that becomes necessary.

BRIEF DESCRIPTION OF THE DRAWINGS

Additional objects and advantages of the present invention will become apparent from a reading of the following detailed description of the preferred embodiments that make reference to the drawings of which:

FIG. 4b is a side view of the collet nut of FIG. 4a.

FIG. 4c is a cross-section view of the collet nut of FIG. 4a.

DETAILED DESCRIPTION

The present invention provides a tool-free collet assembly for a tool. While shown through the drawings in various embodiments of a rotary cutout tool, those skilled in the art will appreciate that the invention is not so limited in scope. In this regard, the teachings of the present invention will be understood to be readily adaptable for use in any tool incorporating a collet assembly for holding a tool accessory (e.g. bit, driver, etc.).

Figure 1:
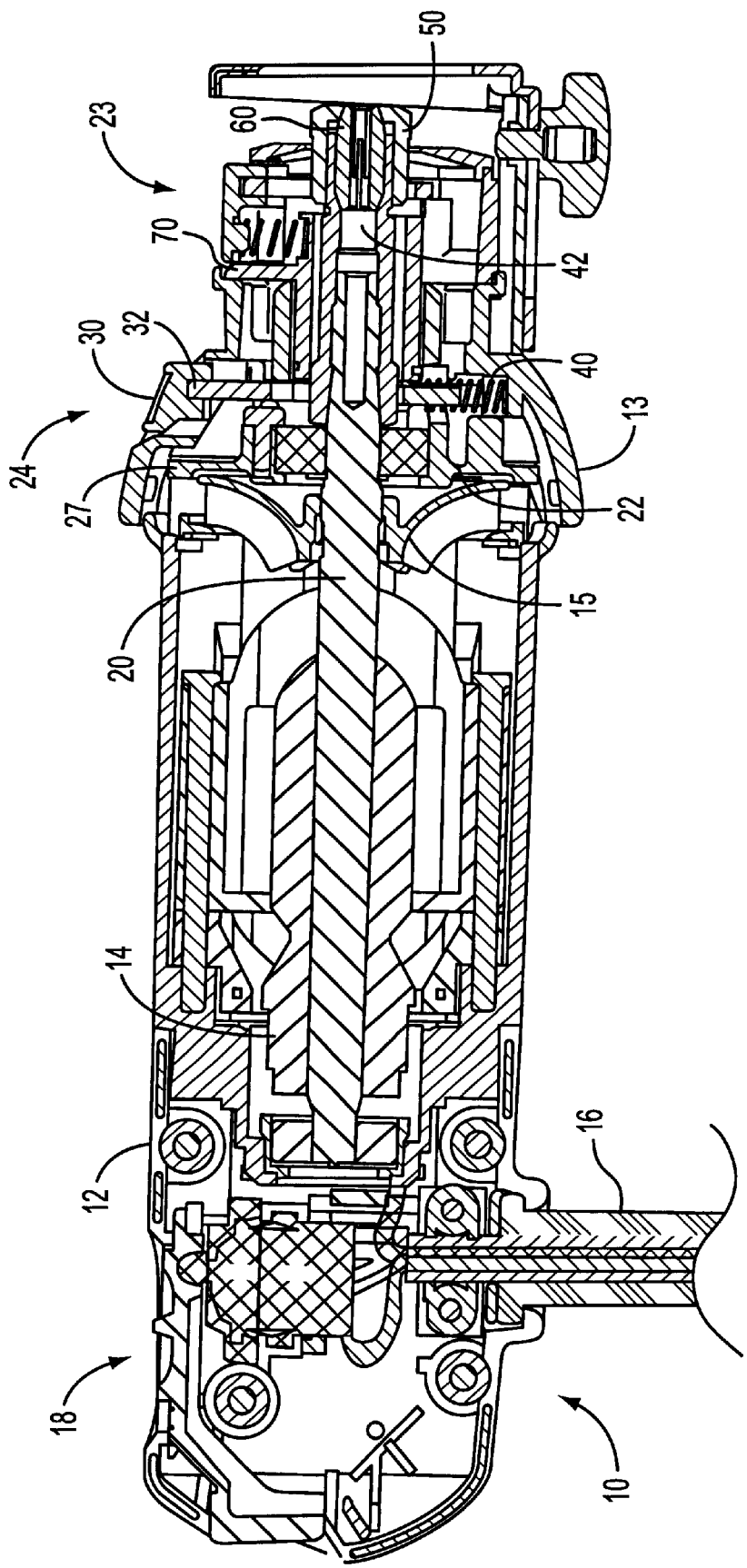
FIG. 1 is a cross-section view of a power tool incorporating a tool free collet assembly in accordance with the present invention.
Figure 2:
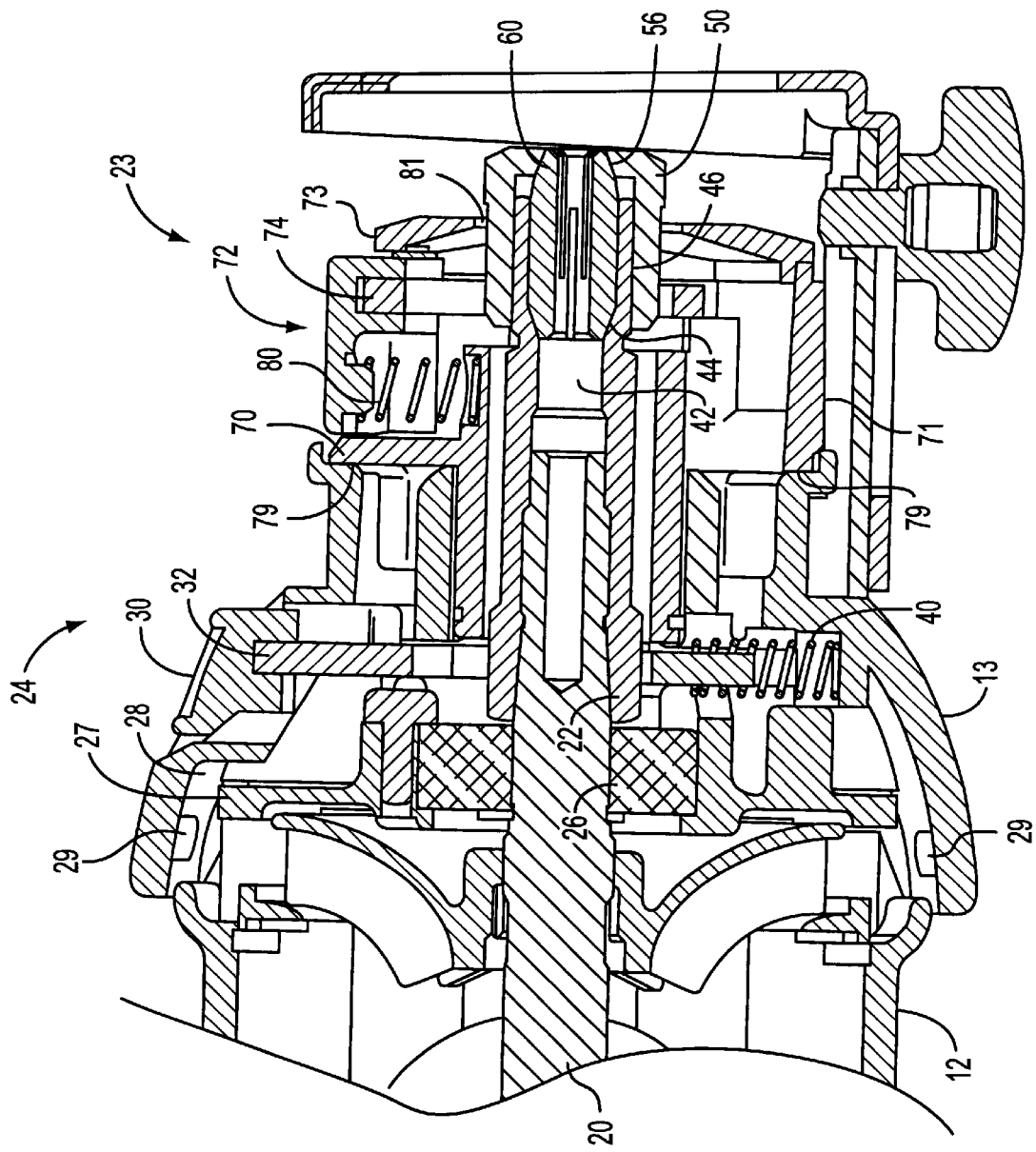
FIG. 2 is an expanded view of a portion of the power tool of FIG. 1.

Turning generally to the drawings in which identical or equivalent elements have been denoted with like reference numerals, and particularly to FIGS. 1 and 2, a power tool is illustrated and designated with the reference numeral 10. The particular power tool shown is, for example, a rotary cutout or router tool 10 including a housing 12. Within the housing 12 is a motor 14 with a cooling fan 15. A power source is connected to the motor 14. In the embodiment shown, the motor 14 is connected to an electrical power cord 16 via a switch 18. An output member is coupled to the motor 14. In this case, the motor shaft 20 is directly coupled to a spindle 22, so that the accessory (not shown) rotates at motor speed. Alternatively, gearing such as is well known in the art could be located at the motor output in order to turn the tool accessory at a speed different from that of the motor.

Figure 3:
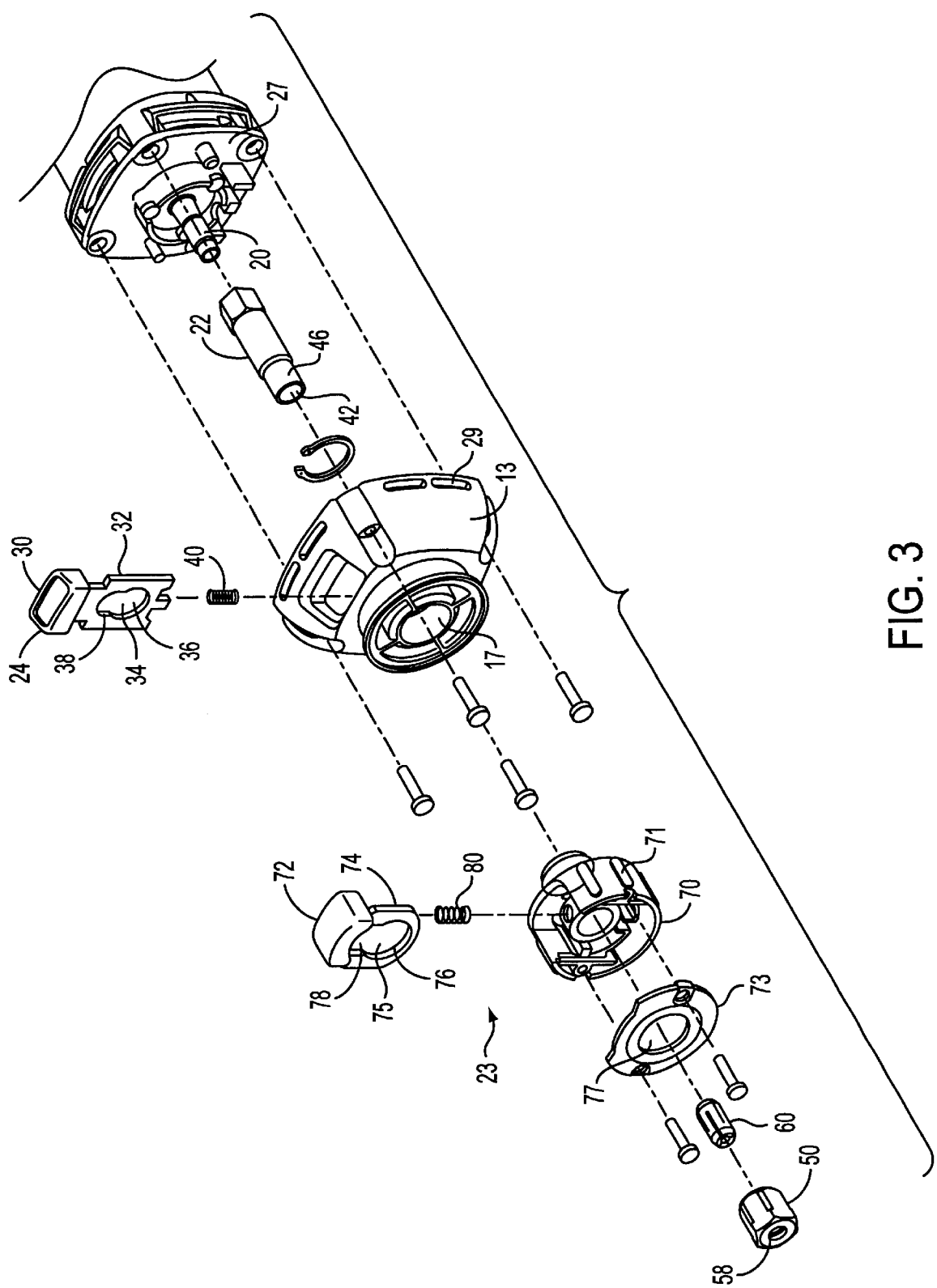
FIG. 3 is an exploded view of the power tool with a collet of FIG. 1.

FIGS. 2 and 3 show expanded views of the collet wrench mechanism 23 and associated structures. Illustrated is the motor shaft 20 supported by bearings 26 in a bearing plate 27 mounted in a front housing shroud 13. Connected to the front end of the motor shaft 20 is a spindle 22. Also located in the front housing shroud 13 is a spindle lock mechanism 24 that locks the spindle/shaft against rotation when installing or removing an accessory (not shown). A spindle lock button 30 in the front housing shroud 13 is connected to a spindle lock plate 32. The spindle lock plate 32 has a cutout 34 through which the spindle 22 passes. The cutout 34 in the spindle lock plate 32 has two portions. The first portion 36 is sized to permit the spindle 22 to freely rotate within it during normal operation of the power tool 10. The second portion 38 is shaped to contact the spindle 22 and prevent its rotation. Thus, the spindle lock plate 32 has a locked and an unlocked position corresponding to the two portions 36 and 38 of the cutout 34. A spring 40 biases the spindle lock plate 32 and button 30 radially upward into the unlocked position.

The spindle 22 extends through an opening 17 in the front housing shroud 13. The forward end of the spindle has a bore 42. The spindle bore 42 defines a portion 44, which tapers axially forwardly and radially outwardly. The forward outer surface 46 of the spindle 22 is threaded.

Figure 4A:
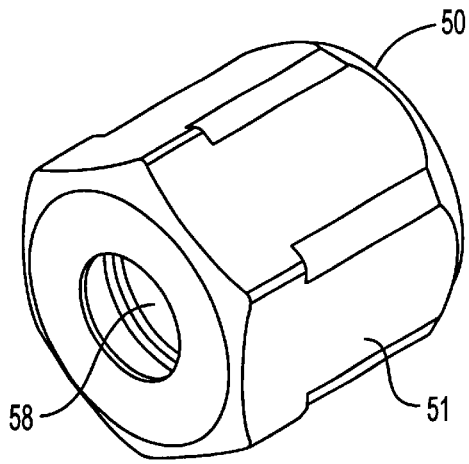
FIG. 4a is a perspective view of the collet nut of FIG. 1.
Figure 4B:
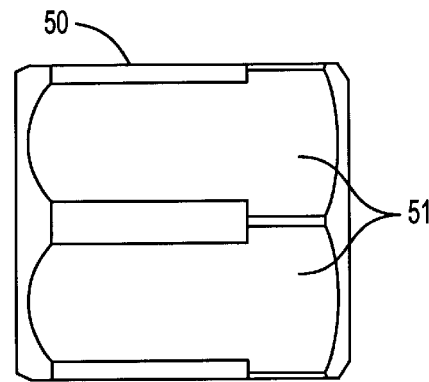
Figure 4C:
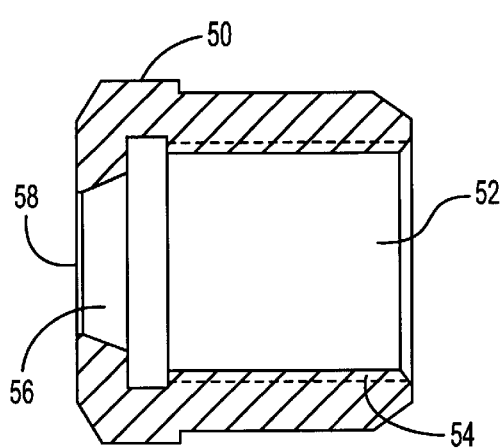

A collet nut 50 is threaded onto the threads 46 of the spindle 22. As illustrated in FIGS. 4 A, B and C, the collet nut 50 has a multifaceted exterior surface 51 for being gripped by a wrench or the like in the conventional manner. The collet nut 50 has a longitudinal bore 52 having two portions. The rearward portion 54 is sized and threaded to mechanically engage the exterior threads on the forward outer surface 46 of the spindle 22. The forward portion 56 of the bore 52 tapers axially forwardly and radially inwardly to an opening 58 in the front face of the collet nut 50.

Figure 5:
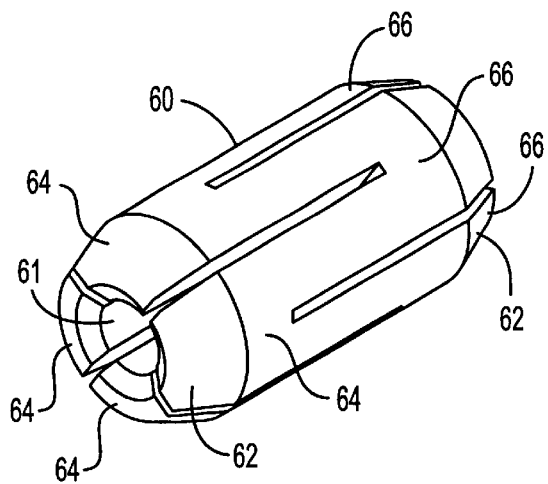
FIG. 5 is a perspective view of the collet of FIG. 1.

A collet 60 is suitably sized and shaped to be captured within and between the forward end of the spindle bore 42 and the collet nut 50. As illustrated in FIG. 5, the collet 60 is generally tubular in shape with an axial bore 61 and conical ends 62 that taper radially inward toward the ends of the collet. Additionally, the collet 60 is axially split into a plurality of front cantilevered jaws 64 and a plurality of rear cantilevered jaws 66.

When the collet 60 is installed within and between the spindle 22 and the collet nut 50, the tapered outer surfaces 62 contact the tapered surfaces 44 in the spindle bore 42 and the tapered surfaces 56 in the collet nut 50. As the collet nut 50 is tightened onto the spindle 22, the tapered surfaces 56 of the collet nut 50 and the tapered surfaces 44 of the spindle bore 42 exert a compression force against the conical tapered surfaces 62 of the collet 60. This force compresses the cantilevered jaws 64 and 66 of the collet 60 radially inward to grip the shank of the accessory (not shown). Conversely, when the collet nut 50 is backed off the spindle 22, the forces exerted by the tapered surfaces 44 and 56 on the cantilevered jaws 64 and 66 are reduced and the jaws expand releasing the shank of the accessory (not shown).

To accommodate tool accessories with shanks of various diameters, such as the commonly available ⅛ inch and ¼ inch diameter sizes, collets 60 with bores 61 of the appropriate internal diameter may be substituted for each other. In order that the interchangeable collets 60 effectively cooperate with the common collet nut 50 and spindle 22, as described above, the interchangeable collets have substantially identical external geometries and dimensions as regards collet parts 62, 64 and 66.

Referring again to FIGS. 2 and 3, the collet 60 and collet nut 50 are partly enclosed within an operating member 70. The operating member 70 is a generally cylindrical structure rotatably mounted on the front housing shroud 13 and does not rotate with the shaft 20 and spindle 22 during normal tool operation. The operating member 70 is of sufficient diameter and may be provided with a textured surface collet grip 71 to provide a comfortable hold that will aid the operator in exerting sufficient torque to tighten or loosen the collet nut 50.

Mounted radially slidably within the operating member 70 is a collet wrench button 72. Attached to the radially inward side of the collet wrench button 72 is a collet wrench plate 74. In one embodiment of the present invention, the collet wrench plate 74 has an opening 75 through it, which surrounds the collet nut 50. The opening 75 in the collet wrench plate 74 has two portions. The first portion 76 corresponds to the disengaged position and is sized so that the collet nut 50 may freely rotate within it during normal operation of the power tool 10. The second portion 78 corresponds to the engaged position and is sized and shaped to contact the exterior faces 51 of the collet nut 50. A collet wrench spring 80 biases the collet wrench button 72 and collet wrench plate 74 radially outward into the disengaged position.

To tighten or loosen the collet 60 around the shank of an accessory (not shown) the operator first locks the spindle 22 against rotation by depressing and holding the spindle lock button 30. This compresses the spring 40 and brings the second portion 38 of the cutout 34 in the spindle lock plate 32 into contact with the spindle 22.

With her other hand, the operator then depresses the collet wrench button 72 and grasps the collet grip 71. Depressing the collet wrench button 72 compresses the collet wrench spring 80 and moves the collet wrench plate 74 radially inward to the engaged position. In the engaged position, second portion 78 of the collet wrench plate 74 contacts the exterior surface 51 of the collet nut 50.

The operator can then rotate the operating member 70 to either tighten or loosen the collet nut 50 and compress or release the collet 60. The collet nut 50 may extend partially beyond the front end 73 of the operating member 70 through an opening 77. The exposed end of the collet nut 50 can then be conveniently finger tightened or loosened before or after applying significant torque with the collet wrench mechanism 23 and the bit inserted or removed. In order to reduce the torque required to firmly hold the shank of the tool accessory the collet nut 50 and/or the spindle 22 on which it is threaded may be coated with a non-stick material such as TEFLON®.

Figure 6A:
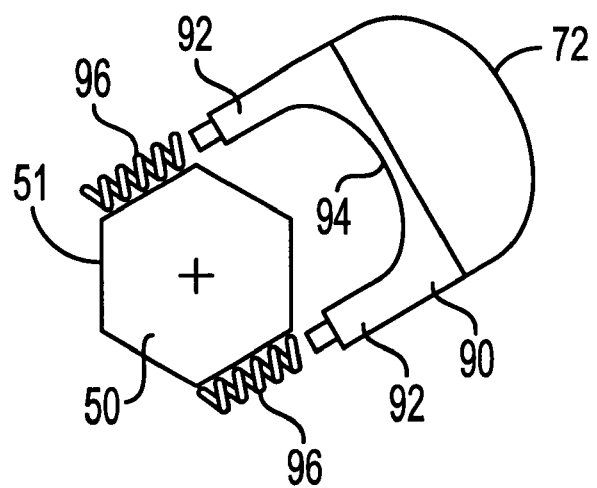
FIG. 6 is a front view of an alternative embodiment of the collet wrench in accordance with the present invention.
Figure 6B:
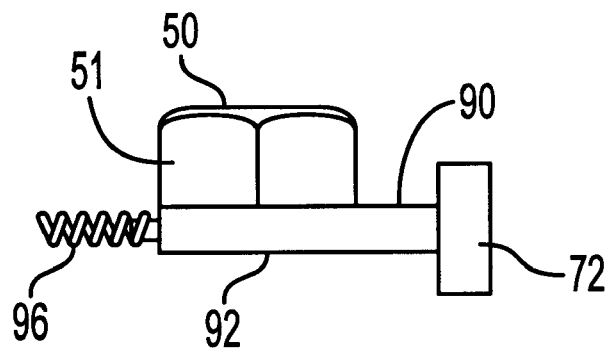

Alternatively, as depicted in FIGS. 6A and 6B, the collet wrench 90 may be open-ended, similar to a conventional open-ended wrench. In this embodiment, the collet wrench 90 has two arms 92 and an open-faced interior surface 94 for grasping the exterior surface 51 of the collet nut 50. At least one spring 96 may bias the collet wrench 90 out of engagement, so that the collet nut 50 may freely rotate during normal operation of the tool.

Figure 7:
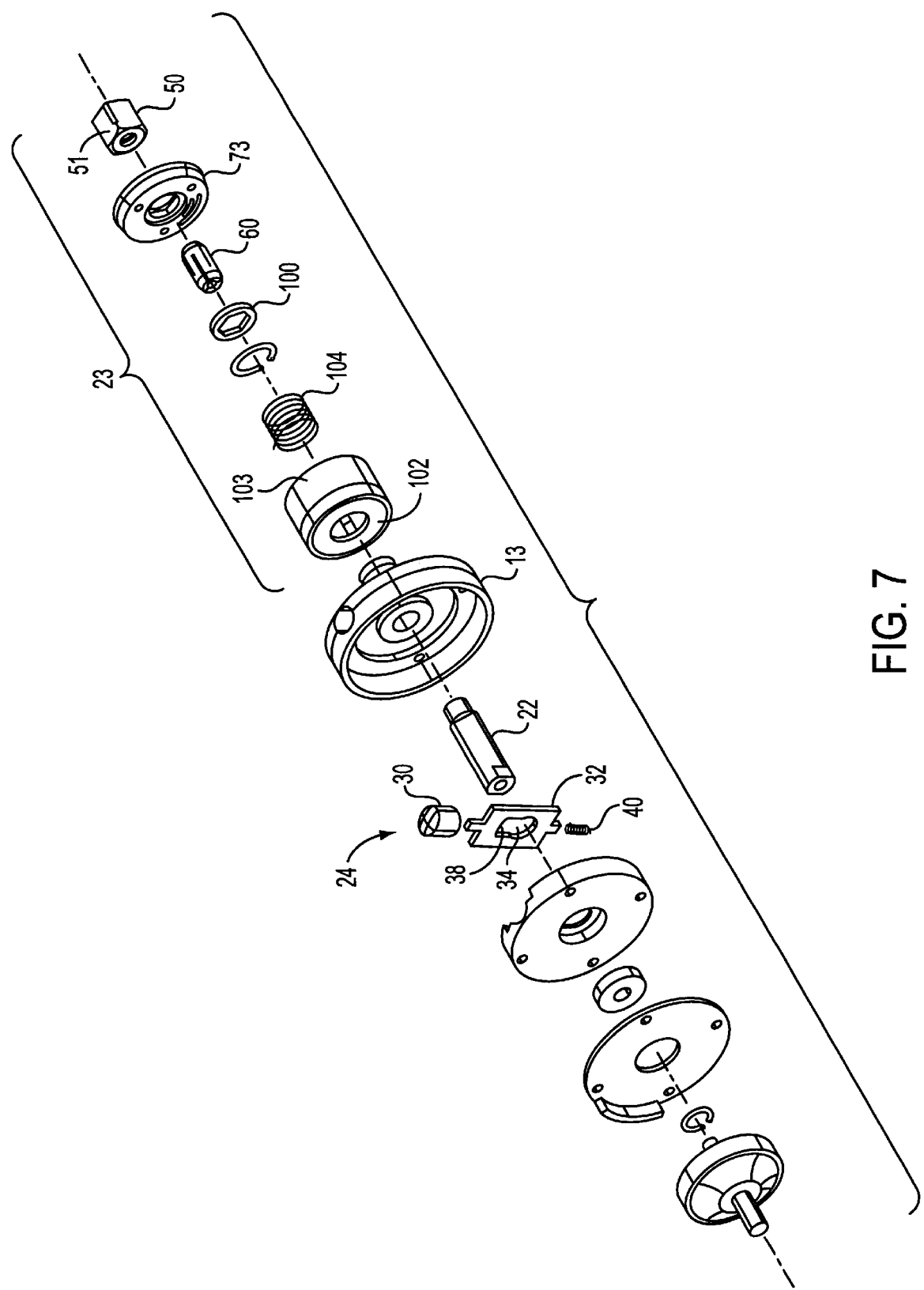
FIG. 7 is an exploded view of an alternative embodiment of the collet assembly in accordance with the present invention.

In still another embodiment, depicted in FIG. 7, the collet wrench 100 moves axially to engage the collet nut 50. In such an embodiment the operating member 102 is arranged to move axially as well as rotationally. A spring 104 axially biases the collet wrench 100 and operating member 102 into the disengaged position. In this embodiment, the collet wrench 100 may take the form of a closed-ended wrench, such as a box wrench.

In the FIG. 7 embodiment, to tighten or loosen the collet 60 around the shank of an accessory (not shown) the operator first locks the spindle 22 against rotation by depressing and holding the spindle lock button 30. This compresses the spring 40 and brings the second portion 38 of the cutout 34 in the spindle lock plate 32 into contact with the spindle 22.

With her other hand, the operator grasps the collet grip 103 and pulls axially rearwardly. Pulling the collet grip 103 moves the operating member 102 rearwardly, compresses the spring 104 and moves the collet wrench 100 axially rearward to the engaged position. In the engaged position, collet wrench 100 contacts the exterior surfaces 51 of the collet nut 50. The operator can then rotate the operating member 102 to either tighten or loosen the collet nut 50 and compress or release the collet 60. Upon releasing the collet grip 103, spring 104 pushes the operating member 102 axially forward and returns the collet wrench 100 to the disengaged position.

Figure 8:
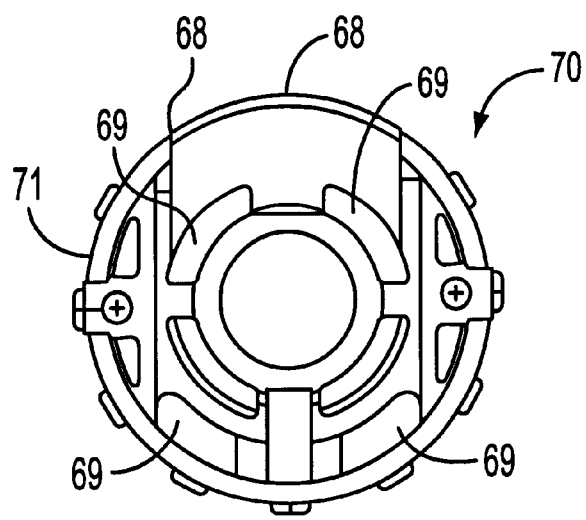
FIG. 8 is an interior view of the operating member.
Figure 9:
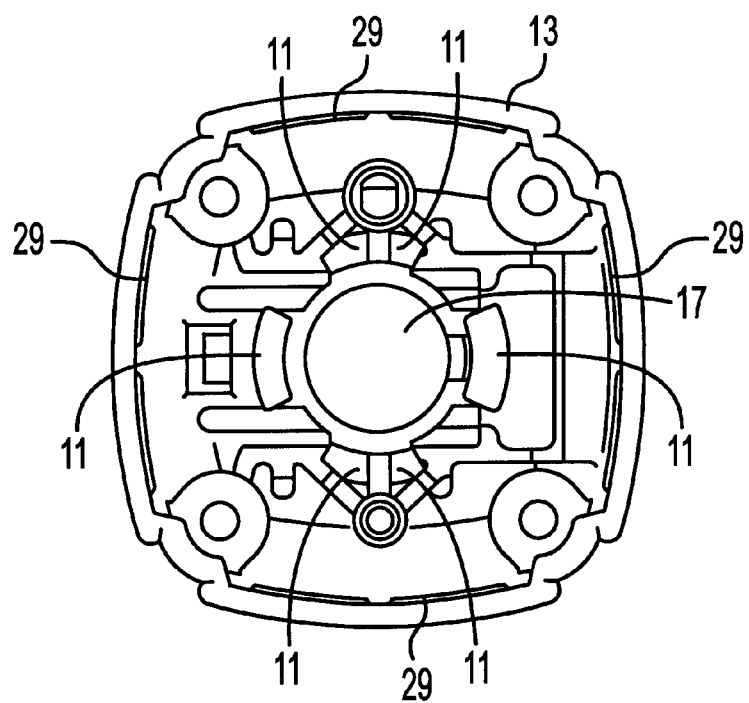
FIG. 9 is an interior view of the front housing shroud.

Considering again the first described embodiment of the collet wrench mechanism 23 and referring now to FIGS. 2, 8 and 9, in order to manage the flow of dust created by the tool, various coacting features are implemented to form a dust management system. For example, operating element 70 may be formed with a number of openings 69 to permit the movement of dust. Dust moving rearward through openings 69 may escape through joint 79, between operating element 70 and front housing shroud 13. Joint 79 is deliberately fitted together with looser tolerances to promote the escape of dust as well as to tolerate the presence of dust that will inevitably invade the joint.

Alternatively or in addition, dust may escape the inside of the operating element by moving forward and out around the collet nut 50, where it extends through opening 77 in plate 73. Opening 77 is sized to provide a perimeter gap 81 around the collet nut 50.

Another escape path for dust in the operating element 70 is around the collet wrench button 72. Surface 68, which forms the opening wherein the collet wrench button 72 resides may be sized to provide a loose fit around the perimeter of the button.

Additionally, the front housing shroud 13 may also be formed with openings 11 that can communicate with the openings 69 in the operating element 70, depending on the rotational orientation. Bearing plate 27 can also be sized and installed to leave a gap 28 between it and the interior surface of the front housing shroud 13. Dust escaping from the region of the front of the front housing shroud 13 via the gap 28 will be picked up and blown out through vent holes 29 by the cooling air flow driven by motor fan 15.

While the above description constitutes three preferred embodiments of the invention, it will be appreciated that the invention is susceptible to modification, variation, and change without departing from the proper scope or fair meaning of the accompanying claims. For example, it will be understood that the teachings of the present invention are directly applicable to other tools employing a collet to hold a tool accessory.

What we claim is:

1. A collet assembly for a tool comprising:
    a collet nut rotatably connectable to the tool;
    a collet operatively connectable to the collet nut; and
    a collet wrench movably connected with the tool and engageable with the collet nut for tightening and loosening the collet.

2. A collet assembly connected to a tool having an output member, the collet assembly comprising:
    a collet nut threadably connected to the output member of the tool and having an axial bore;
    a collet at least partially located within the bore of the collet nut and having an axial bore; and
    a collet wrench rotatably mounted on the tool and movable between an engaged position and a disengaged position such that, when in the engaged position, the collet wrench contacts the collet nut and rotation of the collet wrench can tighten and loosen the collet, and when in the disengaged position the collet wrench does not restrain the collet nut.

3. The collet assembly of claim 2 wherein the collet is an integral part of the output member.

4. The collet assembly of claim 2 wherein the collet is a separate part located within and between the collet nut and the output member.

5. The collet assembly of claim 2 further including a spring connected between the tool and the collet wrench and normally biasing the collet wrench into the disengaged position.

6. The collet assembly of claim 5 wherein the spring is a compression spring.

7. The collet assembly of claim 2 further including means for biasing the collet wrench into the disengaged position.

8. The collet assembly of claim 2 wherein the collet wrench moves axially between the disengaged position and the engaged position.

9. The collet assembly of claim 2 wherein the collet wrench moves radially between the disengaged position and the engaged position.

10. The collet assembly of claim 2 further including an operating member arranged coaxially with the output member and supporting the collet wrench for movement between the engaged position and disengaged position and rotatable for tightening and loosening the collet.

11. The collet assembly of claim 10 wherein the operating member includes a manually graspable generally cylindrical collet grip.

12. The collet assembly of claim 10 wherein the operating member further includes a collet wrench button connected to the collet wrench for manually moving the collet wrench between the engaged and the disengaged positions.

13. The collet assembly of claim 10, wherein the collet nut projects at least partly outside the operating member to permit grasping the collet nut by hand or with a hand tool.

14. The collet assembly of claim 2 wherein the collet wrench is an open-ended wrench.

15. The collet assembly of claim 2 wherein the collet wrench is a closed-ended wrench.

16. The collet assembly of claim 2 wherein the collet wrench comprises a plate defining an opening which substantially encircles the collet nut, the opening having a first portion and a second portion, the collet nut being freely rotatable within the first portion of the opening when the tool is operated, and the second portion being engageable with the collet nut for turning.

17. The collet assembly of claim 2 further including a spindle lock.

18. The collet assembly of claim 10 wherein the operating member has an opening to permit the escape of dust from the collet assembly.

19. The collet assembly of claim 10 further including a joint having dimensions between the tool and the operating member and wherein the joint dimensions are sized to permit the escape of dust from the collet assembly.

20. The collet assembly of claim 12, further including a surface of the operating member that substantially surrounds the collet wrench button, and wherein that surface is sized to permit the escape of dust from the collet assembly around the collet wrench button.

21. The collet assembly of claim 2 wherein at least one of the collet nut and the output member is partially coated with a non-stick material.

22. The collet assembly of claim 4 wherein the collet is one of a first collet having a first bore and first external surfaces and a second collet having a second bore and second external surfaces, the first and second bores having different dimensions and the first and second external surfaces being substantially identical for interchangeably cooperating with the collet nut and output member.

23. A method for connecting a tool accessory having a shank to a rotary tool having an integral collet wrench comprising:
    inserting the shank into a bore of a collet;
    restraining rotation of a shaft in the tool;
    engaging a collet nut with the integral collet wrench; and
    rotating the integral collet wrench for tightening the collet nut and thereby compressing the collet around the shank.

24. The method of claim 23 wherein engaging the collet nut with the integral collet wrench comprises moving the integral collet wrench in a radial direction.

25. The method of claim 23 wherein engaging the collet nut with the integral collet wrench comprises moving the integral collet wrench in an axial direction.

26. The method of claim 23 wherein engaging the collet nut with the integral collet wrench comprises:
    pressing a collet wrench button for moving the integral collet wrench from a disengaged to an engaged position; and
    compressing a collet wrench spring.

27. The method of claim 23 wherein rotating the integral collet wrench comprises:
    gripping an operating member by a collet grip; and
    rotating the operating member for rotating the integral collet wrench.

28. A method for releasing a tool accessory having a shank from a rotary tool having an integral collet wrench comprising:
  restraining rotation of a shaft in the tool;
  engaging a collet nut with the integral collet wrench;
  rotating the integral collet wrench for loosening the collet nut and thereby relieving the compression of a collet around the shank; and
  removing the shank from a bore of the collet.

29. The method of claim 28 wherein engaging the collet nut with the integral collet wrench comprises:
  pressing a collet wrench button for moving the integral collet wrench from a disengaged to an engaged position; and
  compressing a collet wrench spring.

30. The method of claim 28 wherein rotating the integral collet wrench comprises:
  gripping an operating member by a collet grip; and
  rotating the operating member for rotating the integral collet wrench.

31. A power tool comprising:
  a housing;
  a motor within the housing;
  a power source coupled with the motor;
  an output member drivingly connected to the motor;
  an activation member coupled with the power source and the motor for selectively applying power to the motor; and
  a collet assembly coupled with the output member, the collet assembly including:
    a collet nut rotatably connected to the output member;
    a collet operatively connected to the collet nut; and
    a collet wrench movably connected to the housing and engageable with the collet nut for tightening and loosening the collet.

32. A power tool comprising:
  a housing;
  a motor within the housing;
  a power source coupled with the motor;
  an output member drivingly connected to the motor;
  an activation member coupled with the power source and the motor for selectively applying power to the motor; and
  a collet assembly including:
    a collet nut threadably connectable to the output member and having an axial bore;
    a collet at least partially located within the bore of the collet nut and having an axial bore; and
    a collet wrench movably connected to the housing and movable between an engaged position and a disengaged position such that, when in the engaged position, the collet wrench contacts the collet nut and rotation of the collet wrench can tighten and loosen the collet, and when in the disengaged position the collet wrench does not restrain the collet nut.

33. The power tool of claim 32 wherein the collet is an integral part of the output member.

34. The power tool of claim 32 wherein the collet is a separate part located within and between the collet nut and the output member.

35. The power tool of claim 32 wherein the collet assembly further includes a spring connected between the housing and the collet wrench for biasing the collet wrench into the disengaged position.

36. The power tool of claim 35 wherein the spring is a compression spring.

37. The power tool of claim 32 wherein the collet assembly further includes means for biasing the collet wrench into the disengaged position.

38. The power tool of claim 32 wherein the collet wrench moves axially between the disengaged position and the engaged position.

39. The power tool of claim 32 wherein the collet wrench moves radially between the disengaged position and the engaged position.

40. The power tool of claim 32 wherein the collet assembly further includes an operating member arranged coaxial with the output member and supporting the collet wrench for movement between the engaged position and the disengaged position and rotatable for tightening and loosening the collet.

41. The power tool of claim 40 wherein the operating member includes a manually graspable generally cylindrical collet grip.

42. The power tool of claim 40 wherein the operating member further includes a collet wrench button connected to the collet wrench for manually moving the collet wrench between the engaged position and the disengaged position.

43. The power tool of claim 40 wherein the collet nut projects at least partly outside the housing to permit grasping the collet nut by hand or with a hand tool.

44. The power tool of claim 32 wherein the collet wrench is an open-ended wrench.

45. The power tool of claim 32 wherein the collet wrench is a closed-ended wrench.

46. The power tool of claim 32 wherein the collet wrench comprises a plate defining an opening which substantially encircles the collet nut, the opening having a first portion and a second portion, the collet nut being freely rotatable within the first portion of the opening when the tool is operated, and the second portion being engageable with the collet nut for turning.

47. The power tool of claim 32 further including an output member lock.

48. The power tool of claim 40 further including a front housing shroud having an opening for the flow of dust to and from the operating member.

49. The power tool of claim 48 further including a bearing plate mounted inside the front housing shroud but leaving a gap around a portion of the perimeter between the bearing plate and front housing shroud for the passage of dust around the bearing plate.

50. The power tool of claim of claim 40 wherein the operating member has an opening to permit the escape of dust from the collet assembly.

51. The power tool of claim of claim 40 further including a joint having dimensions between the housing and the operating member and wherein the joint dimensions are sized to permit the escape of dust from the collet assembly.

52. The power tool of claim of claim 42, further including a surface of the operating member that substantially surrounds the collet wrench button, and wherein that surface is sized to permit the escape of dust from the collet assembly around the collet wrench button.

53. The power tool of claim 32 wherein at least one of the collet nut and the spindle is partially coated with a non-stick material.

54. The collet assembly of claim 34 wherein the collet is one of a first collet having a first bore and first external surfaces and a second collet having a second bore and second external surfaces, the first and second bores having different dimensions and the first and second external surfaces being substantially identical for interchangeably cooperating with the collet nut and output member.

55. A power tool having a dust management system comprising:

a housing;

a motor within the housing;

a power source coupled with the motor;

an output member drivingly connected to the motor;

an activation member coupled with the power source and the motor for selectively applying power to the motor; and a collet assembly including an operating member and means for expediting the escape of dust which otherwise would accumulate in the collet assembly, the means for expediting including:

an opening in the operating member to permit the escape of dust from the collet assembly;

a joint having dimensions between the tool and the operating member and wherein the joint dimensions are sized to permit the escape of dust from the collet assembly; and a surface of the operating member that substantially surrounds the collet wrench button, and wherein that surface is sized to permit the escape of dust from the collet assembly around the collet wrench button.

56. The power tool of claim 55 further including a front housing shroud having an opening for the flow of dust to and from the operating member.

57. The power tool of claim 56 further including a bearing plate mounted inside the front housing shroud but leaving a gap around a portion of the perimeter between the bearing plate and front housing shroud for the passage of dust around the bearing plate.

58. A power tool for rotatably driving accessory tools comprising:

a housing;

a motor mounted within the housing;

a power source coupled with the motor;

a switch coupled with the power source and the motor for selectively applying power to the motor;

an output shaft drivingly connected to the motor;

a spindle having an axis and a forward end and a rearward end, the rearward end of the spindle connected to the shaft, the forward end of the spindle having an inner and an outer surface, the forward inner surface of the spindle defining an axial bore having a portion tapering rearwardly and inwardly and the forward outer surface of the spindle having threading;

a spindle lock movably connected to the housing between a first position and a second position, wherein the first position the spindle lock does not restrain the rotation of the spindle and wherein the second position the spindle lock restrains the rotation of the spindle; and a collet assembly including:

a generally cylindrical collet nut having an axial bore, a forward end and a rearward end, and an inner surface and an outer surface, the forward inner surface of the collet nut having a portion tapering forwardly and inwardly, the rearward inner surface of the collet nut having a portion threadably engageable with the forward outer threading of the spindle;

a generally tubular collet located within and between the forward end of the spindle and the collet nut, the collet having an axial bore, a plurality of front cantilevered jaws and a plurality of rear cantilevered jaws, the front cantilevered jaws having outer surfaces that taper forwardly and inwardly and slidably engage the forward inner surface of the collet nut, the rear cantilevered jaws having outer surfaces that taper rearwardly and inwardly and slidably engage the forward inner surface of the spindle;

a generally cylindrical operating member rotatably connected to the housing and coaxial with and partially surrounding the spindle, the collet and the collet nut;

a collet wrench plate movably mounted in the operating member and radially slidable between an engaged position and a disengaged position, the plate having an inner perimeter defining an opening through the plate which substantially encircles the collet nut, the opening having a first portion and a second portion, the collet nut being freely rotatable within the first portion of the opening when the tool is operated, which corresponds to the disengaged position, and the second portion engageable with the collet nut for turning, which corresponds to the engaged position;

a spring connected between the operating member and the collet wrench plate for normally biasing the collet wrench plate into the disengaged position;

a collet wrench button connected to the collet wrench plate and externally exposed for manually moving the collet wrench plate into the engaged position and compressing the spring; and a manually graspable generally cylindrical collet grip connected to the operating member.

* * * * *